H. HAUGEN.
LAWN EDGE TRIMMER.
APPLICATION FILED JULY 7, 1917.
1,329,176.
Patented Jan. 27, 1920.
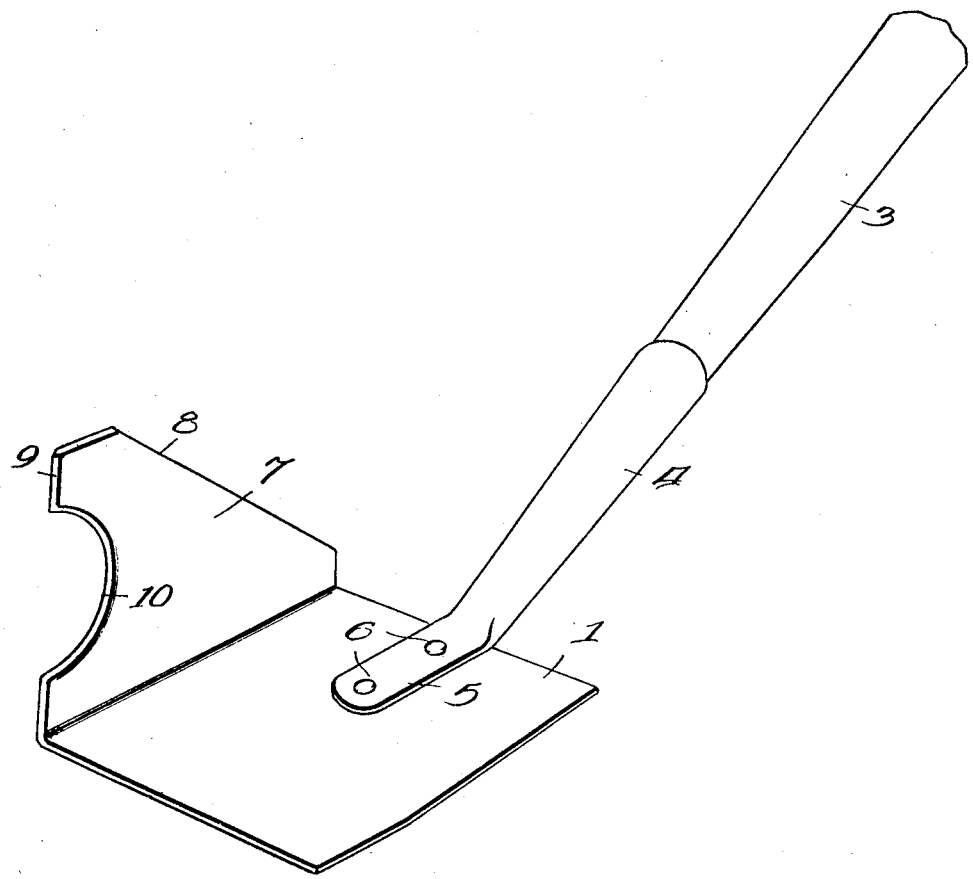
Henry Haugen
Inventor
By Geo. P. Kimmel
Attorney

UNITED STATES PATENT OFFICE.

HENRY HAUGEN, OF STOUGHTON, WISCONSIN.

LAWN-EDGE TRIMMER.

1,329,176.     Specification of Letters Patent.     Patented Jan. 27, 1920.

Application filed July 7, 1917. Serial No. 179,165.

*To all whom it may concern:*

Be it known that I, HENRY HAUGEN, a subject of the King of Norway, and resident of Stoughton, in the county of Dane and State of Wisconsin, have invented certain new and useful Improvements in Lawn-Edge Trimmers, of which the following is a specification.

This invention relates to new and useful improvements in lawn edge trimmers, and the primary object of the invention is to provide a simple and efficient device of this character adapted to be moved along the edge of the lawn, and to evenly trim the edge thereof.

Another object of the invention is to provide a device of this character which is easily and simply constructed, inexpensive to manufacture, and one which will be very efficient in operation.

With these and numerous other objects in view, my invention consists of the novel features of construction, combination and arrangement of parts which will be herein referred to and more particularly pointed out in the specification and claim.

In the accompanying drawing:—

The figure illustrates a perspective view of the device.

In describing my invention I shall refer to the drawing in which similar reference characters designate corresponding parts.

The numeral 1 designates a shovel blade, which is flat, the same being substantially rectangular shaped and provided with a handle 3 positioned in a socket 4, with a flattened lower end 5 that is secured to the upper surface of the blade adjacent the rear edge, by rivets 6 or any other desired type of fastening means.

One side edge of the flat shovel blade 1 is bent upwardly as shown at 7 at right angles to said blade, the upper side adjacent the rear edge thereof being inclined as shown at 8. This upwardly extending portion is designated a cutter, and the same has formed in its front edge 9, intermediate the ends of the same a concaved notch portion 10 which forms the primary cutting means of the device.

In operation, the flat blade 1 is placed on the ground adjacent the edge of the lawn, and the same is moved forward by the handle 3, the cutter trimming the edge of the lawn, by the front edge thereof, particularly the concaved portion engaging said edge and trimming the same. The dirt will fall from the cutter edge onto the shovel blade, where the same may be easily removed. The notch portion forms a guide in addition to a cutter, to direct the edge removed onto the flat blade. This tool is comparatively small, so that the same may be operated by hand, and will very efficiently trim the edge of a lawn. This operation was heretofore carried out by a shovel or knife, which was comparatively difficult when compared with the operation of this type of lawn edge trimmer.

From the above description taken in connection with the accompanying drawing, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having fully described my invention, what I claim as new, and desire to secure by Letters Patent, is:—

A lawn trimmer comprising a flat shovel-like portion having an extension formed at one side thereof and bent upwardly at substantially right angles thereto, said extension having its rear edge disposed at a rearward inclination, while the forward edge thereof is disposed perpendicular and sharpened to provide a cutting edge, the forward edge being cut into to provide a concaved notch to form a primary cutter, the lower portion of said extension being of a length corresponding to the length of the shovel whereby to materially brace and strengthen the device and to provide means for packing the earth engaged thereby.

In testimony whereof I affix my signature hereto.

HENRY HAUGEN.